Dec. 13, 1938.          R. M. RIBLET            2,140,190
                  AUTOMOTIVE AXLE CONSTRUCTION
                  Filed April 2, 1937      2 Sheets-Sheet 1
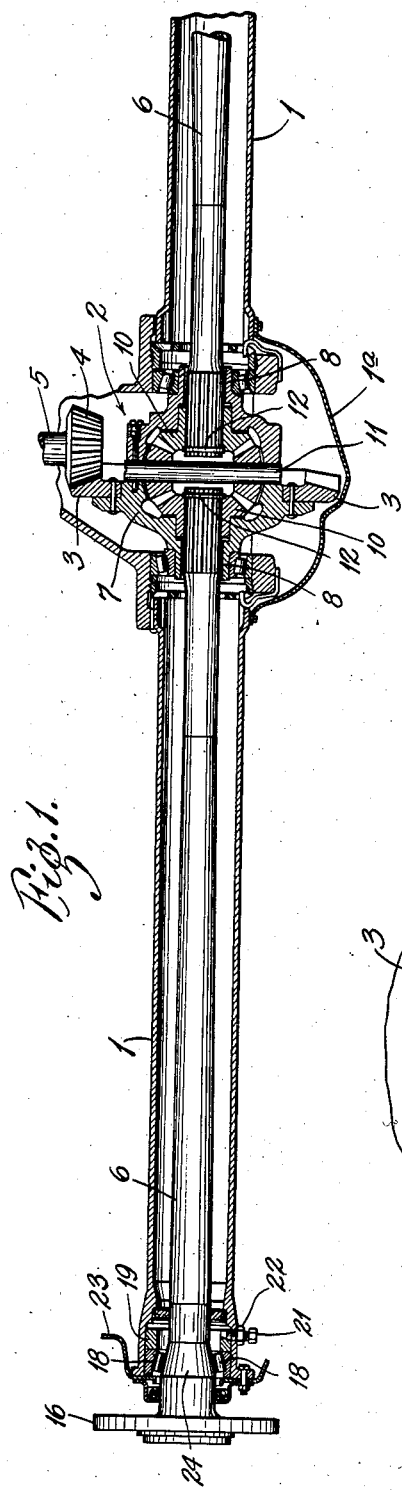
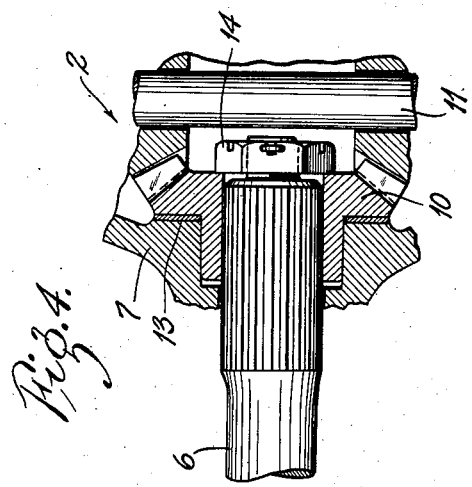
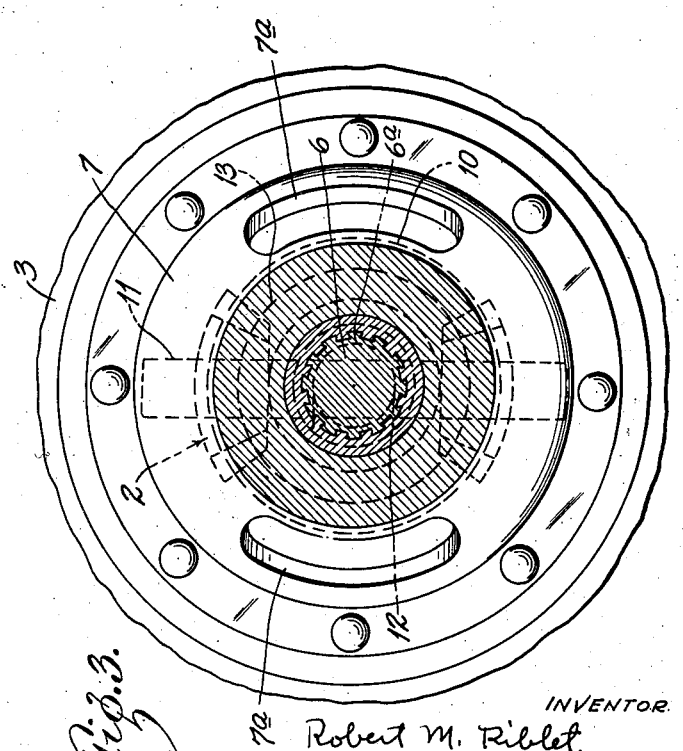
INVENTOR.
Robert M. Riblet,
by Carr Kerr Gravely,
HIS ATTORNEYS Dec. 13, 1938.　　　　R. M. RIBLET　　　　2,140,190
AUTOMOTIVE AXLE CONSTRUCTION
Filed April 2, 1937　　　2 Sheets-Sheet 2
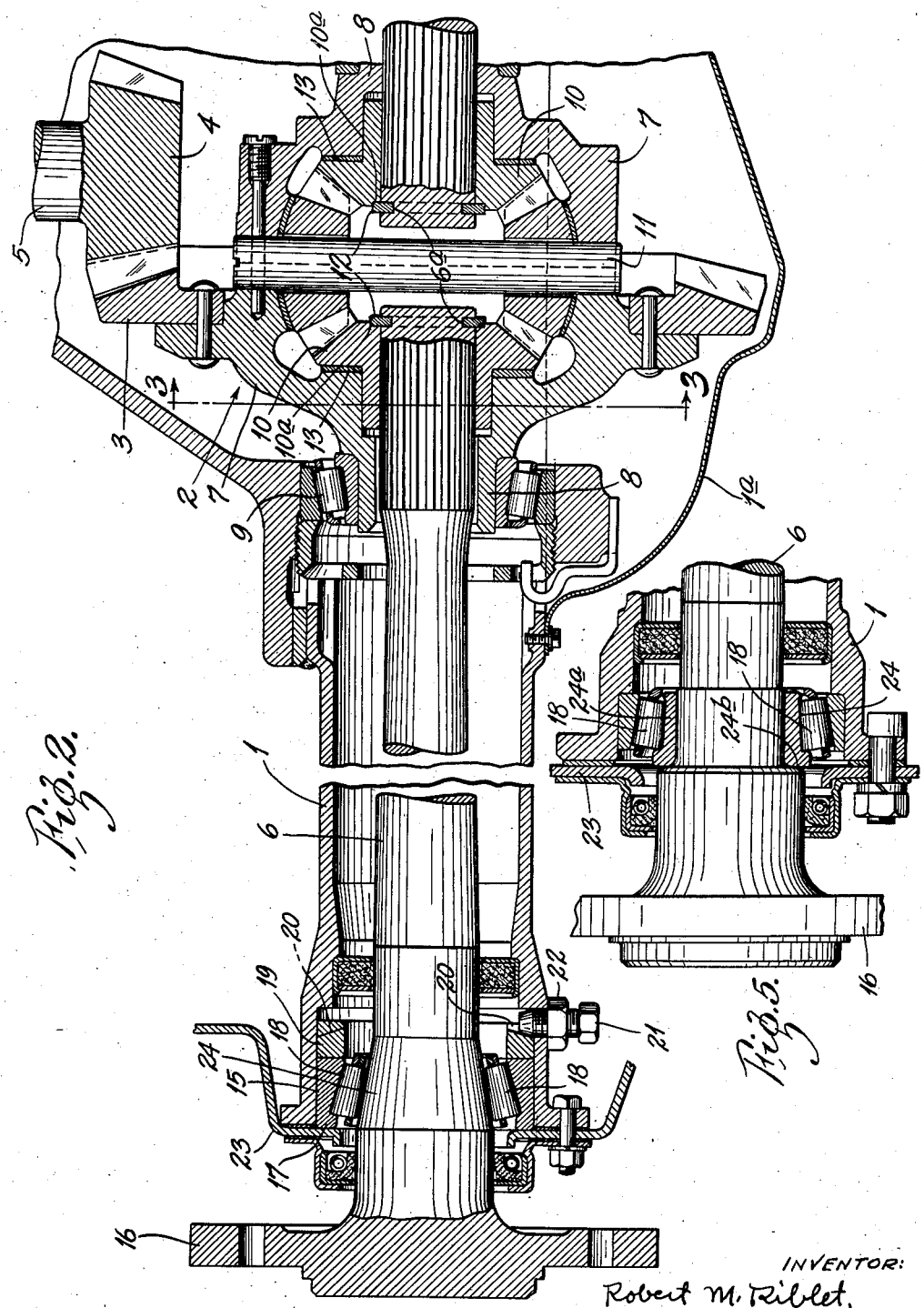
INVENTOR:
Robert M. Riblet,
by Carr Kan Gravely,
HIS ATTORNEYS.

Patented Dec. 13, 1938

2,140,190

UNITED STATES PATENT OFFICE 2,140,190

AUTOMOTIVE AXLE CONSTRUCTION

Robert M. Riblet, Canton, Ohio, assignor to The Timken Roller Bearing Company, Canton, Ohio, a corporation of Ohio Application April 2, 1937, Serial No. 134,613

6 Claims. (Cl. 74—311)

My invention relates to automotive axles and has for its principal object to improve the means for taking care of the end thrusts of the axle shafts and also to improve the construction in other particulars. The invention consists in an axle construction wherein the inward thrust on an axle shaft is transmitted to the axle housing through a roller bearing in the outer end of said housing and wherein the outward thrust is transmitted to the housing through the bearing which carries the adjacent hub of the differential mechanism. It also consists in a construction hereinafter described whereby rubbing of the end of the shaft is avoided and whereby an axle shaft may be easily withdrawn from the housing without affecting the differential mechanism. The invention also consists in the construction and in the arrangements and combinations of parts hereinafter described and claimed.

In the accompanying drawings wherein like numerals refer to like parts wherever they occur, Fig. 1 is a longitudinal sectional view of an axle construction embodying my invention;

Fig. 2 is a similar section on an enlarged scale,

Fig. 3 is a fragmentary cross-section on the line 3—3 in Fig. 2,

Fig. 4 is a fragmentary longitudinal section showing a modified arrangement for securing the side gear to the shaft section; and Fig. 5 is a longitudinal section showing the inner raceway of the bearing on the end of the axle formed on a sleeve mounted on the axle shaft.

In common with other axle constructions of the same type, my axle construction comprises a housing 1 in the form of two tubular end portions and an enlarged intermediate portion in which is mounted a suitable differential mechanism 2 which has a ring gear 3 meshing with a pinion 4 on a propeller shaft 5 suitably supported on said middle portion. Access may be had to the differential mechanism through an opening in the axle housing which is closed by a removable cover 1a. The axle housing also encloses axle shafts 6 whose inner ends are connected to the differential mechanism and whose outer ends are connected to the traction wheels.

The differential housing 7 has laterally extending hubs 8 and roller bearings 9 interposed between said hubs and seats provided therefor in the sides of the enlarged portion of the axle housing. The side gears 10 of the differential have hubs in which the inner end portions of the respective shaft sections are splined with a sliding fit. The inner ends of the axle shafts 6 extend entirely through said side gears but are spaced away from the differential pin 11. The inwardly projecting end portions of each axle shaft have a circumferential groove 6a in which is mounted a horseshoe or C-shaped washer 12 which projects radially beyond the outer surface of the shaft and fits within a counterbore 10a provided therefor in the inner end of the side gear through which said axle shaft extends. By this arrangement, any thrust or force tending to move the axle shaft longitudinally outwardly is transmitted through said washer to said side gear of the differential mechanism and thence through a wear plate 13 to the differential housing 7, and thence through the roller bearing 9 to the axle housing 1. Instead of grooving the shaft for the washer, its projecting end may be screw-threaded and provided with a nut 14, as shown in Fig. 4. The horseshoe washer 12 (or nut 14) is accessible for working tools through openings 7a in the differential housing 7 located to permit such tools to clear the side gears and pinions of the differential mechanism.

In each end of the hollow axle housing a seat is provided for the cup or outer raceway member 15 of a taper roller bearing in which the axle shaft 6 is mounted. The end portion of the axle shaft projects beyond the end of the axle housing and preferably is widened out in the form of a wide flange 16 adapted for the attachment of the traction wheel thereto.

According to the present invention, the outer raceway member 15 of the roller bearing in the end of the axle housing has a conical raceway disposed with its surface converging inwardly or in the direction of the differential mechanism. At the outer or large end of this raceway surface and extending inwardly therefrom, the outer raceway member has an annular rib 17 against which the large ends of the conical rollers 18 abut. Movably mounted in the end portion of the axle housing next inwardly of the roller bearing cup is a backing or adjusting ring 19. The inner face of said ring is provided with a number of radially disposed semi-conical slots 20, that is, slots which are deeper on the outer surface of the axle housing than on the inner surface and whose wall tapers inwardly. Into these slots extend the tapered ends of cap screws 21 which work in threaded holes provided therefor in the axle housing, said screws being provided with set nuts 22 outside of the axle housing. By this arrangement, the radial movement of the set screws causes their inclined end portions to bear against the inclined walls of the slots and move the adjusting ring longitudinally of the axle so as to adjust the position of the outer raceway member of the bearing and serve as an adjustable abutment therefor. These set screws also serve to hold the C-washers 12 in the seat 10a provided therefor in the inner end of the side gear 10 and thus prevent accidental disengagement of said washer from the groove 6a provided therefor in the axle shaft 6. The outer end of said outer raceway member bears against a member 23, preferably the inner margin of the brake disk, which is bolted or otherwise suitably mounted on the end of the axle housing.

Preferably the inner raceway 24 of the roller bearing of the axle shaft is formed directly on the axle shaft, whose surface is enlarged in conical form for the purpose. In such case, the raceway portion 24 of said shaft is case-hardened, as by the electric induction method, leaving the other portions of the shaft unhardened and unaffected by the heat treatment of the raceway portion.

When the axle construction hereinbefore described is in service, each axle shaft 6 is subject to end thrust inwardly or outwardly as conditions vary. When the thrust is in an inward direction, it is transmitted from the raceway portion 24 of the shaft through the rollers 18, the outer raceway member 15, the adjusting ring 19 and the adjusting screws 21 to the axle housing. When the thrust on the axle shaft 6 is in an outward direction, it is transmitted from the shaft 6 through the washer 12 (or nut 14), the side gear 10 of the differential, the wear plate 13, the differential housing 7, and the inner raceway member, the bearing rollers and the outer raceway member of the bearing 9 for the hub of the differential housing to the axle housing.

My axle construction has several important advantages. Although the axle shaft has only one row of rollers, the construction takes care of thrust in both directions without any rubbing or sliding of the axle shaft on any other part, so that there is no need for fitting or hardening the shaft for such rubbing. Another advantage is that the construction relieves the differential pin of all end thrust. Another important advantage is that it provides for a quick and easy removal of the axle shaft from the axle housing without dismantling any portion of the differential mechanism and without removing the rollers or outer raceway members of the shaft bearings. In order to remove the axle shaft from the axle housing, the cap screws are unscrewed far enough to release the bearing adjusting ring sufficiently to enable said shaft to be pushed inwardly far enough to carry the C-washer thereon clear of the recess in the inner end of the side gear through which said shaft extends. Such movement of the shaft is permitted by reason of the space normally provided between the end of the axle shaft and the differential spider. The washer is then removed from the inner end of the axle shaft, which is an easy operation because the washers are accessible for implements introduced through the openings in the differential housing opposite the space between the side gears and the differential spider.

Another important advantage of my construction lies in the simplicity and strength of the outer end portion of the axle shaft, as the raceway portion of the shaft flares toward the outer end of the shaft and at its wider portion merges into the thick portion of the shaft which has the duty of transmitting the axle load to the road wheel. It is also noted as a considerable advantage of the construction that it dispenses with the separate cone or inner bearing that is commonly mounted on the axle shaft and thus effects economy and permits the use of larger rollers without increasing the diameter of the axle housing.

While it is preferable to form the conical inner raceway 24 directly on the axle shaft because of the special advantages of this feature of construction, many of the advantages of the hereinbefore described axle construction may be obtained by forming such raceway on a sleeve 24a that is mounted on the axle shaft with its outer end abutting against an annular shoulder 24b thereon.

What I claim is:

1. In an automotive axle construction of the kind described, an axle housing having therein similar axle shafts, a differential mechanism connecting said axle shafts and taper roller bearings for the hubs of the differential mechanism and other taper roller bearings for the outer end portions of the axle shafts, the inner end portions of said axle shafts projecting through the respective side gears of the differential mechanism and having removable means on their projecting portions abutting against the inner ends of said side gears, the inner ends of said axle shafts being spaced apart and the space next to the inner end of each axle shaft being unobstructed, the rollers of each axle shaft bearing and of the adjacent hub bearing tapering toward each other, said differential mechanism comprising a housing with a hole therein through which said removable means is accessible for removal without dismantling any portion of the differential mechanism.

2. In an automotive axle construction of the kind described, an axle housing having therein similar axle shafts, a differential mechanism connecting said axle shafts and taper roller bearings for the hubs of the differential mechanism and other taper roller bearings for the outer end portions of the axle shafts, the inner end portions of said axle shafts projecting through the respective side gears of the differential mechanism and having means on their projecting portions bearing against the inner ends of said side gears and said differential housing having openings through which said means are removable without dismantling any portion of the differential mechanism, the inner ends of said axle shafts being spaced apart and the space next to the inner end of each axle shaft being unobstructed, the rollers of each axle shaft bearing and of the adjacent hub bearing tapering toward each other and the outer raceway members of the axle bearings having thrust ribs at their large ends whereby the axle shafts may be removed from the axle housing without disturbing the differential mechanism or the assembly of rollers and outer raceway members.

3. In an automotive axle construction of the kind described, an axle housing having therein similar axle shafts, a differential mehcanism connecting said axle shafts and taper roller bearings for the hubs of the differential mechanism and other taper roller bearings for the outer end portions of the axle shafts, the inner end portions of each axle shaft projecting through a side gear of the differential mechanism and having removable means on its projecting portion for abutting against the inner end of said side gear, said differential mechanism comprising a housing with a hole therein through which said removable means is accessible for removal without dismantling any portion of the differential mechanism, the inner ends of said axle shafts being spaced apart and the space next to said ends being unobstructed and said differential housing having an opening through which said means is accessible and removable without affecting said differential mechanism, the rollers of each shaft bearing and of the differential bearing adjacent thereto tapering toward each other and the outer raceway member of each axle bearing having a thrust rib at its large end and the inner raceway member being formed on the axle shaft, whereby the axle shaft may be removed from the axle housing without removing the rollers or outer raceway of the shaft bearing and without disturbing the differential mechanism.

4. In an automotive axle construction of the kind described, an axle housing having therein axle shafts, a differential mechanism connecting said axle shafts and taper roller bearings for the hubs of the differential mechanism and other taper roller bearings for the outer end portions of the axle shafts, the inner end portions of said axle shafts projecting through the respective side gears of the differential mechanism and having grooves in their projecting portions and washers removably mounted in said grooves, without dismantling any portion of the differential mechanism the inner ends of said axle shafts being spaced apart and the space next to the inner end of each axle shaft being unobstructed, the rollers of each axle shaft bearing and of the adjacent hub bearing tapering toward each other and the outer raceway member of the axle bearings having thrust ribs at their large ends.

5. An automotive axle construction having a housing, a differential mechanism and axle shafts in said housing, and roller bearings for said differential mechanism and axle shafts respectively, the axle shaft bearings being mounted in the ends of the housing and capable of taking end thrust in a direction longitudinally inward with relation to said shafts respectively, and the differential mechanism bearings being mounted in the middle portion of the housing and capable of taking end thrust longitudinally outwardly with relation to said shafts, each shaft projecting through a side gear of the differential mechanism and having thereon detachable means for engaging the inner end of said side gear, the inner ends of said axle shafts being spaced apart and the space next to said ends being unobstructed said differential mechanism having a housing with an opening therein through which said detachable means may be removed without disturbing the differential mechanism.

6. An automotive axle construction having a housing, a differential mechanism and axle shafts in said housing, and roller bearings for said differential mechanism and axle shafts respectively, the axle shaft bearings being mounted in the ends of the housing and capable of taking end thrust in a direction longitudinally inward with relation to said shafts respectively, and the differential mechanism bearings being mounted in the middle portion of the housing and capable of taking end thrust longitudinally outwardly with relation to said shafts, each shaft projecting through a side gear of the differential mechanism and a threaded nut detachably mounted on the end of said shaft, said differential mechanism having a housing with an opening therein through which said detachable means may be removed without disturbing the differential mechanism, the inner ends of said axle shafts being spaced apart and the space next to said ends being unobstructed whereby said shaft may be withdrawn from the housing upon removal of said nut.

ROBERT M. RIBLET.